United States Patent [19]

Ferree

[11] Patent Number: 4,719,330
[45] Date of Patent: Jan. 12, 1988

[54] WELDING ELECTRODE

[75] Inventor: Stanley E. Ferree, Hanover, Pa.

[73] Assignee: Alloy Rods Corporation, Hanover, Pa.

[21] Appl. No.: 918,602

[22] Filed: Oct. 10, 1986

Related U.S. Application Data

[63] Continuation of Ser. No. 270,160, Jun. 3, 1981, abandoned.

[51] Int. Cl.[4] .............................................. B23K 35/30
[52] U.S. Cl. ......................... 219/146.32; 219/145.22; 219/146.3; 219/146.41
[58] Field of Search .................. 219/146.32, 146.41, 219/145.22, 146.24, 146.3

[56] References Cited

U.S. PATENT DOCUMENTS

| Re. 26,611 | 6/1969 | Claussen | 219/146.32 |
|---|---|---|---|
| 3,051,822 | 8/1962 | Bernard et al. | 219/74 |
| 3,177,340 | 4/1965 | Danhier | 219/146.41 X |
| 3,733,458 | 5/1973 | Pokhodnya et al. | 219/146.32 |
| 3,800,120 | 3/1974 | Helton et al. | 219/146 |
| 3,868,487 | 2/1975 | Yoshinori et al. | 219/73 |
| 3,924,091 | 12/1975 | Suzuki et al. | 219/73 |
| 4,029,934 | 6/1977 | Clark et al. | 219/145 |
| 4,109,059 | 8/1978 | DeHaeck | 219/145.22 X |
| 4,125,758 | 11/1978 | Oishi et al. | 219/126 |
| 4,282,420 | 8/1981 | Banks | 219/146.41 X |
| 4,366,364 | 12/1982 | Arai et al. | 219/146.24 |

FOREIGN PATENT DOCUMENTS 858854  1/1961  United Kingdom ........... 219/146.32

Primary Examiner—R. R. Kucia
Attorney, Agent, or Firm—James C. Valentine

[57] ABSTRACT

A flux-cored, gas shielded welding electrode is disclosed having a generally tubular sheath and a core defined within the sheath, wherein the core includes a slag forming system consisting essentially from about 3 to 12 percent titanium dioxide, less than about 2 percent calcium fluoride, and from about 0.1 to 1.0 percent sodium oxide, potassium oxide or other arc stabilizer, based on the total electrode weight. The electrode of the present invention further includes from about 0.003 to 0.08 percent boron based on the total electrode weight.

8 Claims, No Drawings

WELDING ELECTRODE

This is a continuation of application Ser. No. 270,160 filed June 3, 1981 and now abandoned.

BRIEF SUMMARY OF THE INVENTION

The present invention is directed to welding electrodes, and more particularly, to flux-cored welding electrodes wherein the core includes a specific rutile based slag system with a small amount of boron added thereto, wherein the slag system includes little or no magnesium oxide.

Various welding electrode compositions are disclosed in the prior art. For example, U.S. Pat. No. 3,868,487 discloses a flux-cored wire for submerged arc welding which contains a large proportion of calcium fluoride. Also, U.S. Pat. No. 3,924,091 pertains to a cored welding wire of neutral composition, i.e. having a basicity in the range of about 0.90 to 1.30. U.S. Pat. No. 4,029,934 relates to a solid steel welding wire which may contain 0.002 to 0.008% boron in the steel. And, U.S. Pat. No. 4,125,758 teaches the use of a consumable strip electrode which may contain boron.

A commercially acceptable flux-cored continuous welding electrode is disclosed in U.S. Pat. No. 3,051,822. Such electrode is employed in a welding process which utilizes a dual principal for shielding the welding operation. In particular, a slag is formed during welding to shield the molten weld metal, and a gas is used simultaneously to shield the arc column. An improved welding electrode, particularly adapted for use in vertical, or other out-of-position welding is disclosed in U.S. Pat. No. 3,800,120. The slag system employed in these contemporary, gas shielded, flux-cored electrodes are based, primarily, on titanium dioxide.

It appears that welds deposited with an electrode having a titanium dioxide based slag system may pick up titanium that has been reduced from the slag at high arc temperatures experienced during welding. It has been found that such titanium may be detrimental to the notch toughness of the weld especially in the stress relieved condition.

An alternative welding electrode is described in U.S. Pat. No. 4,282,420, having a slag system which though based at least in part on titanium dioxide, is able to produce a weld which exhibits improved notch toughness and impact properties. The core of such electrode includes a slag forming system comprising from about 5 to about 9 percent titanium dioxide, from about 0.2 to 1.0 percent magnesium oxide, less than about 2 percent calcium fluoride, and from about 0.003 to 0.08 percent boron, based on the total electrode weight.

An objective of the present invention is to provide a flux-cored electrode similar to that described in U.S. Pat. No. 4,282,420, but which utilizes a titanium oxide based slag system which has little or no magnesium oxide. The weld from such electrode exhibits improved notch toughness and impact properties over conventional rutile based electrodes while maintaining good operating characteristics for welding in all positions.

An advantage of reducing or eliminating the amount of MgO in the core of an electrode, is that the feeding and agglomeration problems which may occur during manufacture of an electrode that contains fine MgO powder in the core, may be reduced.

Another advantage of reducing the amount of MgO in the core of the electrode, is the reduction of a compound which may absorb moisture that could be reduced in the arc and increase the possibility of hydrogen cracking. Thus, the present invention beneficially reduces the amount of hydrogen which may be present in the weld deposit.

A further advantage of the present invention is that improved notch toughness and impact properties can be attained with rutile based electrodes which contain little or no magnesium oxide.

Additionally, the reduction of MgO level in the core of an electrode reduces the overall cost of the electrode and may reduce the fume level produced during welding.

These and other objectives and advantages of this invention will be more fully understood and appreciated with reference to the following description.

DETAILED DESCRIPTION

The electrode of the present invention includes a generally tubular ferrous metal sheath. The sheath is formed of the metal to be consumed and transferred to the weld. In a preferred embodiment the electrode sheath may be formed from cold rolled strip material. Such strip material may be formed into an intermediate semicircular shape. While the strip is in such semicircular configuration, the core materials, preferably homogeneously mixed together, may be poured therein. Then, the strip or sheath, is closed about the core materials. Where desired, the electrode may be drawn or rolled to sizes smaller than the originally formed electrode. It will be understood that such forming and drawing operations have the effect of compressing the core materials, eliminating any void spaces throughout the length of the electrode, and preventing shifting or segregation of the core materials during shipment or use.

The core of the electrode of the present invention comprises a mixture of slag forming ingredients, deoxidizers, arc stabilizers, and alloying ingredients. Additionally, iron powder may also be added to the core of the flux-cored electrode of the present invention to increase the deposition rate.

The slag forming system of the electrodes of the present invention is based on the oxide of titanium, $TiO_2$. More particularly, the slag forming ingredients in the core of the electrode include from about 3.0 to about 12.0 percent titanium dioxide. The percentages stated herein are based on the total electrode weight unless specified to the contrary. Preferably titanium dioxide in the core comprises from about 6.25 to 7.75 percent of the total weight of the electrode. The titanium dioxide does not have to be in the pure form, but can be in other forms such as alkali metal titanates, leucoxene, and the like.

The slag forming system of the present invention contains little or no magnesium oxide. In particular, the core of the electrode contains less than about 0.2 percent magnesium oxide, MgO. The prior art, particularly U.S. Pat. No. 4,282,420 taught that MgO must be present in the core of such electrode in amounts of from about 0.2 to about 1.0 percent. It has been found by the present invention that less than about 0.2 percent MgO could be utilized in the core of the electrode, and yet the impact properties of the weld deposited by the electrode are improved over conventional titanium dioxide based slag systems.

The slag forming system of the present invention further contains less than 2.0 percent calcium fluoride, CaF₂. The calcium fluoride contributes to the cleanliness of a weld deposit, and increases the viscosity of the slag which covers and protects the weld metal from the atmosphere. The calcium fluoride together with the titanium dioxide provides a slag viscosity necessary to support the molten metal during welding especially during welding in positions other than horizontal.

The oxide of sodium, Na₂O, in the range of from about 0.10 to 1.0 percent, is also added to the core of the electrode. Sodium oxide serves as an arc stabilizer during welding and increases the basicity of the slag.

Basicity is an index of the oxygen potential of the flux system. It is commonly represented as a ratio of the basic oxides (including alkali oxides and other more thermodynamically stable oxides) to the acid oxides. Basicity is commonly represented by an equation such as:

Basicity Index =

$$\frac{CaO + CaF_2 + MgO + K_2O + Na_2O + \frac{1}{2}(MnO + FeO)}{SiO_2 + \frac{1}{2}(Al_2O_3 + TiO_2 + ZrO_2)}$$

It is known that welding electrode flux compositions with a higher basicity have less inclusions and a potential for better toughness. Conversely, flux compositons with a lower basicity tend to have better wetting characteristics. Wetting characteristics is generally defined as the ability to form a good bond with the base material and form a deposit with a smooth surface profile. Also, lower basicity flux compositions are more likely to have all-position welding capability. As discussed above, an advantage of this invention is the provision of an improved slag system having the beneficial properties of the basic fluxes while maintaining the all-position capability and good wetting characteristics of the acid fluxes. Furthermore, improved impact properties are maintained even though little or no magnesium oxide is utilized in the slag system of the present invention.

Deoxidizers and alloying ingredients in the core of the welding electrode of the present invention may include from about 0.30 to 2.0 percent silicon, from about 0.50 to 4.5 percent manganese, and from about 0.003 to 0.080 percent boron. Additional metals, including iron, nickel, chrome and molybdenum powder alloys, may be added to the core of the electrode to produce low alloy weld deposits. The silicon and manganese may be added to the core in a combined form such as ferrosilicon, ferromanganese, ferromanganese-silicon, calcium silicide, and the like. The manganese and the silicon in the core deoxidize the weld deposit, and the silicon further contributes to the out-of-position capabilities of the electrode by forming silicon oxides in the arc during welding, thereby increasing the viscosity and support capability of the slag.

However, it should be noted that silicon may have a detrimental effect on deposit toughness, as may be measured by a Charpy V-Notch impact test, and, therefore the silicon content should be minimized if good toughness is a primary goal, especially after stress relief treatments. But some silicon is necessary to deoxidize the weld deposit, control the slag viscosity and freezing characteristics, and promote the good fusion of the weld deposit to the base plate and with a smooth contour.

As taught in U.S. Pat. No. 4,282,420, the specified additions of the microalloy boron in the titanium dioxide slag based electrode reduce the detrimental effect which titanium is known to have on the impact properties and notch toughness of a weld deposit. Welds deposited with conventional electrodes having a slag forming system based on titanium dioxide can contain titanium which is reduced from the slag at high arc temperatures. Such titanium, typically present in the deposited weld in a range of from about 0.02 to 0.07 percent, is detrimental to the notch toughness of the weld, especially in the stress relieved condition. The detrimental effect of titanium is attributed to the precipitation of titanium at the grain boundaries of the weld deposit, perhaps in the form of a carbonitride.

It is also known that the heat input of the flux-cored welding process, when welding with a conventional titanium dioxide slag based electrode, results in the formation of a large percentage of grain boundary proeutectoid ferrite. Acicular ferrite is also found between the long columnar grains of such proeutectoid ferrite. Large percentages of proeutectoid ferrite has been found to be detrimental to the impact properties of a deposited weld since they provide areas which offer little or no resistance to the propagation of a crack.

Welds deposited with the electrode of the present invention have been found to exhibit improved notch toughness and impact properties, more particularly, the titanium has less of an adverse effect on the impact properties of a weld deposit when boron has been added to the core of the electrode. It appears that the titanium acts to provide the internal shielding necessary to protect the boron from oxidation or forming a nitride. Also, the boron in the electrode of the present invention promotes grain refinement. In particular, when boron, in the range of from about 0.003 to 0.08 percent of the total electrode weight, is added to the core of the electrode, less proeutectoid ferrite, and more acicular ferrite is formed during solidification of the weld. Also, with the electrode of the present invention, the remaining proeutectoid ferrite grains become discontinuous further improving the impact properties of the deposited weld.

A gas shield is preferably provided about the arc when welding with the electrode of the present invention. Shielding gases may include, by way of example, carbon dioxide, carbon dioxide—argon mixtures, and argon—oxygen mixtures. It has also been found that a current value in a range of from about 150 to 300 amperes at about 20 to 30 volts is sufficient to weld with the electrodes of the present invention, particularly in the vertical position.

Table I below sets forth the chemical composition of an exemplary electrode of the present invention and one electrode with a conventional titanium dioxide slag system. The only major difference between these electrodes is the addition of boron to the electrode of Example 2.

TABLE I

| Electrode Constituents | Composition Amount (% of total electrode weight) | |
|---|---|---|
| | Example 1 | Example 2 |
| TiO₂ | 7.35 | 7.00 |
| MgO | — | — |
| CaF₂ | — | — |
| Na₂O | 0.26 | 0.25 |
| Si | 1.08 | 1.03 |
| Mn | 2.84 | 2.70 |
| B | — | 0.02 |
| Fe | remainder | remainder |

The chemistry of the welds deposited with the electrodes set forth in the above examples, with a carbon dioxide shielding gas and a current value of about 200 amperes at about 24 volts, are set forth in Table II below. It should be understood that other welding parameters would be optimum for welding in other positions and with different shielding gases.

TABLE II

| Weld Deposit | Amount (% by weight) | |
|---|---|---|
| Constituents | Example 1 | Example 2 |
| C | .066 | .064 |
| Mn | 1.23 | 1.29 |
| Si | .46 | .49 |
| P | .006 | .006 |
| S | .018 | .019 |
| Ti | .031 | .035 |
| B | — | .007 |

The as-welded physical properties of the welds specified in the above examples for both flat and vertical welding positions are set forth in Table III below:

TABLE III

| | Example 1 | | Example 2 | |
|---|---|---|---|---|
| | flat | vertical-up | flat | vertical-up |
| Mechanical Properties | | | | |
| Yield Strength (ksi) | 82.0 | 68.8 | 85.6 | 71.3 |
| Tensile Strength (ksi) | 93.2 | 82.1 | 92.0 | 84.4 |
| Elongation (%) | 26 | 26 | 26 | 28 |
| Reduction of Area (%) | 64 | 68 | 66 | 67 |
| Average CVN Impacts | | | | |
| +72° F. (ft.lbs.) | 73 | 76 | 89 | 97 |
| 0° F. (ft.lbs.) | 45 | 41 | 64 | 72 |
| −20° F. (ft.lbs.) | 30 | 23 | 57 | 55 |

Table IV, below, sets forth the chemical composition of another exemplary electrode (Example 3) of the present invention, and that of an electrode with MgO and CaF$_2$ in the ranges disclosed in U.S. Pat. No. 4,282,420 referenced above (Example 4). This Table shows the acceptability of elimination of the MgO, and optionally the CaF$_2$, from the slag system.

TABLE IV

| | Amount (% of total electrode weight) | |
|---|---|---|
| Electrode Constituents | Example 3 | Example 4 |
| TiO$_2$ | 7.40 | 7.32 |
| MgO | 0.52 | — |
| CaF$_2$ | 0.07 | — |
| Na$_2$O | 0.22 | 0.22 |
| Si | 0.92 | 0.91 |
| Mn | 1.72 | 1.70 |
| B | 0.019 | 0.019 |
| Fe | Remainder | Remainder |

Weld deposit chemistries provided by welding with electrodes set forth in the above examples with a 75% argon/25% CO$_2$ shielding gas, are set forth below in Table V:

TABLE V

| Weld Deposit | Amount (% by weight) | |
|---|---|---|
| Constituents | Example 3 | Example 4 |
| C | .045 | .042 |
| Mn | 1.08 | 1.05 |
| Si | .55 | .56 |
| P | .005 | .005 |
| S | .019 | .018 |
| Ti | .04 | .04 |
| B | .007 | .007 |

The as-welded (AW) and stress relieved (SR) physical properties of welds deposited in the flat position set forth in examples 3 and 4 are shown in Table VI below:

TABLE VI

| | Example 3 | | Example 4 | |
|---|---|---|---|---|
| | AW | SR* | AW | SR* |
| Mechanical Properties | | | | |
| Yield Strength (ksi) | 72.5 | 67.8 | 72.3 | 67.8 |
| Tensile Strength (ksi) | 83.7 | 81.4 | 83.4 | 80.9 |
| Elongation (%) | 27 | 29 | 29 | 29 |
| Reduction of Area (%) | 67 | 69 | 73 | 74 |
| Average CVN Impacts | | | | |
| +72° F. (ft.lbs.) | 103 | 106 | 89 | 100 |
| 0° F. (ft.lbs.) | 60 | 53 | 53 | 44 |
| −50° F. (ft.lbs.) | 37 | 24 | 34 | 23 |

*Stress relieved 8 hours at 1125° F.

The following examples in Table VII further demonstrate the acceptability of eliminating magnesium oxide and optionally calcium fluoride from the slag system of the electrodes of the present invention. Only a minor reduction in impact properties occurs when MgO and CaF$_2$ are removed from the slag system.

TABLE VII

| | | Example 5 | Example 6 |
|---|---|---|---|
| Slag Constituents in the Core (% of Total Electrode Weight) | | | |
| TiO$_2$ | | 7.24 | 7.33 |
| CaF$_2$ | | 0.07 | — |
| Na$_2$O | | 0.39 | 0.32 |
| MgO | | 0.53 | — |
| Average CVN Impact Strength (ft.lbs.) with CO$_2$ shielding gas, vertical position | | | |
| Stress relieved | 0° F. | 69 | 58 |
| 8 Hours at 1125° F. | −20° F. | 58 | 45 |

What is believed to be the best mode of this invention has been described above. It will be apparent to those skilled in the art that numerous variations of the illustrated details may be made without departing from this invention.

What is claimed is:

1. A welding electrode having a generally tubular ferrous metal sheath, and a core defined within the sheath for use in gas shield welding wherein the shielding gas is selected from the group consisting of carbon dioxide, inert gas, oxygen and inert gas mixtures and mixtures thereof, said core consisting of, by total weight of the electrode,
   from about 3.0 to 12.0% titanium dioxide;
   from about 0 to less than 0.2% magnesium oxide;
   up to about 2.0% calcium fluoride;
   from about 0.1 to 1.0% sodium oxide;
   from about 0.5 to 4.5% manganese;
   from about 0.003 to 0.08% boron; and
   the balance consisting of an alloy powder selected from the group consisting of nickel, chrome, molybdenum, iron and mixtures thereof, whereby an electrode having a core within the above range is less moisture absorbent than is the electrode with at least 0.2% MgO in its core.

2. A welding electrode as set forth in claim 1 wherein the core comprises from about 6.0 to 8.0% titanium dioxide.

3. A welding electrode as set forth in claim 1 wherein the core comprises from about 0.5 to 1.5% silicon.

4. A welding electrode as set forth in claim 1 wherein the core comprises from about 1.5 to about 3.0% manganese.

5. A welding electrode as set forth in claim 1 wherein the core comprises from about 0.01 to 0.03% boron.

6. A welding electrode as set forth in claim 1 wherein the core comprises from about 0.5 to 5.0% of an alloy powder selected from the group consisting of nickel, chrome, molybdenum, iron and mixtures thereof.

7. A welding electrode having a generally tubular ferrous metal sheath, and a core defined within the sheath for use in gas shield welding wherein the shielding gas is selected from the group consisting of carbon dioxide, inert gas, oxygen and inert gas mixtures, and mixtures thereof, said core consisting essentially of, by total weight of the electrode,
- from about 6.0 to 8.0% titanium dioxide,
- from about 0.04 to 0.09% calcium fluoride,
- from about 0.2 to 0.4% sodium oxide,
- from about 0.5 to 1.5% silicon,
- from about 1.5 to 3.0% manganese, and
- from about 0.01 to 0.03% boron.

8. A welding electrode having a generally tubular ferrous metal sheath and a core defined within the sheath for use in gas shielded welding wherein the shielding gas is selected from the group consisting of carbon dioxide, inert gas, oxygen and inert gas mixtures and mixtures thereof, said core having a slag forming system consisting essentially of, by total weight of the electrode,
- from about 3 to 12% titanium dioxide;
- less than about 2% calcium fluoride;
- less than 0.2% magnesium oxide;
- from about 0.1 to 1% of a compound selected from the group consisting of sodium oxide, potassium oxide and mixtures thereof and
- from about 0.003 to 0.08% boron, whereby an electrode having a core within the above range is less moisture absorbent than is the electrode with at least 0.2% magnesium oxide in its core.

* * * * *

UNITED STATES PATENT AND TRADEMARK OFFICE
CERTIFICATE OF CORRECTION

PATENT NO. : 4,719,330
DATED : January 12, 1988
INVENTOR(S) : Stanley E. Ferree

It is certified that error appears in the above-identified patent and that said Letters Patent is hereby corrected as shown below:

Col. 6, Claim 1, line 50, after "consisting" please add --essentially--.

Col. 6, Claim 1, line 56, before "from about 0.5 to 4.5% manganese" please add --from about 0.2 to 2.0% silicon,--.

Signed and Sealed this

Twenty-ninth Day of December, 1992

*Attest:*

DOUGLAS B. COMER

*Attesting Officer*   *Acting Commissioner of Patents and Trademarks*